US011913479B2

(12) United States Patent
Wan et al.

(10) Patent No.: US 11,913,479 B2
(45) Date of Patent: Feb. 27, 2024

(54) IMPACT-RESISTANT BALANCED HYDRO-CYLINDER WITH PRESSURE RELIEF AND BUFFERING PROTECTION

(71) Applicant: SHANDONG UNIVERSITY OF SCIENCE AND TECHNOLOGY, Shandong (CN)

(72) Inventors: Lirong Wan, Shandong (CN); Xuehui Yu, Shandong (CN); Dejian Ma, Shandong (CN); Jiantao Wang, Shandong (CN); Fengwen Xin, Shandong (CN); Zhaoji Li, Shandong (CN); Guoqing Qi, Shandong (CN); Baolong Chen, Shandong (CN)

(73) Assignee: SHANDONG UNIVERSITY OF SCIENCE AND TECHNOLOGY, Shandong (CN)

( * ) Notice: Subject to any disclaimer, the term of this patent is extended or adjusted under 35 U.S.C. 154(b) by 62 days.

(21) Appl. No.: 17/781,439

(22) PCT Filed: Apr. 30, 2021

(86) PCT No.: PCT/CN2021/091362
§ 371 (c)(1),
(2) Date: Jun. 1, 2022

(87) PCT Pub. No.: WO2022/016949
PCT Pub. Date: Jan. 27, 2022

(65) Prior Publication Data

US 2022/0412380 A1 Dec. 29, 2022

(30) Foreign Application Priority Data

Dec. 9, 2020 (CN) ........................ 202011425245.0

(51) Int. Cl.
*F15B 15/20* (2006.01)
*F15B 15/22* (2006.01)
*F15B 15/17* (2006.01)

(52) U.S. Cl.
CPC .............. *F15B 15/17* (2013.01); *F15B 15/20* (2013.01); *F15B 15/204* (2013.01); *F15B 15/22* (2013.01)

(58) Field of Classification Search
CPC ...... F15B 15/148; F15B 15/20; F15B 15/202; F15B 15/204; F15B 15/226; F15B 15/227
See application file for complete search history.

(56) References Cited

U.S. PATENT DOCUMENTS 2,915,043 A * 12/1959 Neiner .................. F15B 15/227 92/62
3,162,092 A * 12/1964 Corwin ................. F15B 15/227 92/164

(Continued)

FOREIGN PATENT DOCUMENTS

CN 204664021 U * 9/2015 .............. F15B 15/22
CN 206144898 U * 5/2017 .............. F15B 15/22

(Continued)

OTHER PUBLICATIONS

CN-204664021-U Translation (Year: 2015).*

(Continued)

*Primary Examiner* — Michael Leslie
(74) *Attorney, Agent, or Firm* — Nadya Reingand

(57) ABSTRACT

An impact-resistant balanced hydro-cylinder with pressure relief and buffering protection comprises a cylinder body (11), a piston (13), a piston rod (14), and a first valve core (21) and a second valve core (51) slidable relative to the cylinder body (11). A closed first gas cavity (22) and a closed second gas cavity (52) are respectively formed between the two valve cores and inner walls of two opposite ends of the (Continued)

cylinder body (11). A closed first oil cavity (32) and a closed second oil cavity (42) are respectively formed between the two valve cores and two end faces of the piston (13). A through hole (33) for the first oil cavity and a through hole (43) for the second oil cavity are respectively provided in the positions on the cylinder body (11) corresponding to the first oil cavity (32) and the second oil cavity (42).

9 Claims, 2 Drawing Sheets

(56) References Cited

U.S. PATENT DOCUMENTS

| | | | | | |
|---|---|---|---|---|---|
| 3,303,756 | A * | 2/1967 | Geeson | F15B 11/076 92/143 |
| 4,700,611 | A * | 10/1987 | Kaneko | F15B 15/227 91/405 |
| 5,309,817 | A * | 5/1994 | Sims | F15B 15/227 92/85 B |
| 6,176,170 | B1 * | 1/2001 | Uppgard | F15B 15/227 440/61 G |
| 6,481,335 | B2 * | 11/2002 | Shteynberg | F15B 11/076 92/143 |
| 6,899,206 | B2 * | 5/2005 | Antonovsky | F16F 9/0209 188/315 |
| 7,011,192 | B2 * | 3/2006 | Antonovsky | F16F 9/0209 198/315 |
| 10,443,590 | B1 * | 10/2019 | McCoy | F15B 15/1461 |

FOREIGN PATENT DOCUMENTS

| | | | | |
|---|---|---|---|---|
| CN | 115076186 A * | 9/2022 | F15B 15/202 |
| FR | 1045365 A * | 11/1951 | F15B 15/22 |

OTHER PUBLICATIONS

CN-206144898-U Translation (Year: 2017).*
FR 1045365 A Translation (Year: 1951).*
CN-115076186-A Translation (Year: 2022).*

* cited by examiner

IMPACT-RESISTANT BALANCED HYDRO-CYLINDER WITH PRESSURE RELIEF AND BUFFERING PROTECTION

CROSS REFERENCE TO RELATED APPLICATION

This patent application claims the benefit and priority of Chinese Patent Application No. CN202011425245.0 filed on Dec. 9, 2020, the disclosure of which is incorporated by reference herein in its entirety as part of the present application.

TECHNICAL FIELD

The present disclosure relates to the field of hydraulic equipment, in particular to an impact-resistant balanced hydro-cylinder with pressure relief and buffering protection.

BACKGROUND ART

Equilibrium jack is a key component for controlling the angle of the top beam, the supporting resultant force and the cutting off resistance of the shield type hydraulic support, and the arrangement of the equilibrium jack directly affects the stress state and the working performance of the support. When a traditional hydraulic support is subject to ground pressure of shock bump of the roof, the equilibrium jack can also bear a certain impact effect, and buffering protection is achieved mainly by means of pressure relief of an external safety valve when the impact effect is too large. However, in actual use process, if the hydraulic support is impacted by a heavy load, the safety valve of the equilibrium jack cannot be opened in time, and the equilibrium jack or a connecting lug thereof can be damaged to a certain degree, which brings loss of special function of the equilibrium jack of the shield type hydraulic support, and directly affects the normal underground production and the safety of miners. Particularly, the issue becomes increasingly prominent on a working face with an oversized mining height and a complex ground pressure of shock bump, and is one of important factors influencing high-yield and high-efficiency production of modern mines.

SUMMARY

In order to solve the above issues, the present disclosure provides an impact-resistant balanced hydro-cylinder with pressure relief and buffering protection, and the technical scheme adopted by the present disclosure is as follows.

An impact-resistant balanced hydro-cylinder with pressure relief and buffering protection includes a cylinder body, a piston, a piston rod, and a first valve core and a second valve core slidable relative to the cylinder body, wherein a closed first gas cavity is formed between the first valve core and an inner wall of an end of the cylinder body and a closed second gas cavity is formed between the second valve core and an inner wall of an opposite end of the cylinder body, a closed first oil cavity is formed between the first valve core and an end face of the piston and a closed second oil cavity is formed between the second valve core and another end face of the piston, and a through hole for the first oil cavity is provided at a position on the cylinder body corresponding the first oil cavity and a through hole for the second oil cavity is provided at a position on the cylinder body corresponding to the second oil cavity.

On the basis of the scheme, a one-way valve for the first gas cavity and a one-way valve for the second gas cavity are mounted on the cylinder body and communicate with the first gas cavity and the second gas cavity respectively.

Preferably, a limiting boss for the first gas cavity and a limiting boss for the first oil cavity are arranged on the inner wall of the cylinder body on two sides of the first valve core respectively, a limiting boss for the second gas cavity and a limiting boss for the second oil cavity are arranged on the inner wall of the cylinder body on two sides of the second valve core respectively, and the limiting boss for the first gas cavity and the limiting boss for the second gas cavity are arranged close to end faces of the cylinder body respectively.

On the basis of the scheme, the limiting boss for the first gas cavity, the limiting boss for the first oil cavity, the limiting boss for the second oil cavity and the limiting boss for the second gas cavity each are annular bosses, and are integrally formed with the cylinder body.

Preferably, an oil drainage hole for the first oil cavity is formed at a position on the cylinder body corresponding to the first valve core and an oil drainage hole for the second valve core is formed at a position on the cylinder body corresponding to the second valve core, and when the first valve core and the second valve core abut against the limiting boss for the first gas cavity and the limiting boss for the second gas cavity respectively, the oil drainage hole for the first oil cavity and the oil drainage hole for the second oil cavity communicate with the first oil cavity and the second oil cavity respectively.

Preferably, the first gas cavity and the second gas cavity are internally provided with damping elements respectively, and the damping elements are arranged on inner walls of two ends of the cylinder body respectively.

On the basis of the scheme, the damping elements include a disc spring for the first gas cavity disposed in the first gas cavity and a disc spring for the second gas cavity disposed in the second gas cavity.

On the basis of the scheme, two ends of the disc spring for the first gas cavity abut against the inner wall of the cylinder body and the first valve core respectively, and two ends of the disc spring for the second gas cavity abut against the inner wall of the cylinder body and the second valve core respectively.

Preferably, valve core sealing rings are arranged at positions on the cylinder body where the first valve core and the second valve core contact with the cylinder body, a piston sealing ring is arranged at a position on the piston where the cylinder body contacts with the piston, and piston rod sealing rings are arranged at positions on the piston rod where the second valve core and the cylinder body contact with the piston rod respectively.

Preferably, a connecting hole for the cylinder body is formed in an end of the cylinder body away from the piston rod, and a connecting hole for the piston rod is formed in a tip of a free end of the piston rod.

The present disclosure has the following beneficial effects.

First, the scheme provides a balanced hydro-cylinder with pressure relief and buffering protection, wherein there is no need for a buffer device to be additionally arranged for a hydraulic system of a hydraulic support, and the structure is simplified.

Second, when the pressure in the cylinder body is too large and the safety valve is not opened, safe and stable pressure relief is achieved through the overflow effect of the oil drainage holes in the cylinder body, overflow is stopped when the pressure is reduced to a rated value, then the pressure in the oil cavities are kept stable, and the valve cores are reset; and the hydro-cylinder is buffered through the cooperation effect of the high-pressure gas cavities and the disc springs, and the stability and the reliability in the buffering process are improved.

Third, an equilibrium jack on the hydraulic support can be replaced, when the cylinder body is impacted by a heavy load or the cylinder body is too large in pulling force and too high in oil cavity pressure and the safety valve is unlikely to open in time, the effects of multi-stage buffering and rapid overflow unloading can be achieved through high-pressure gas and the disc springs in the gas cavities, the buffering effect and buffering force are enhanced, the piston rod can be effectively prevented from being broken or the cylinder body can be effectively prevented from being damaged due to the fact that the overflow valve cannot be opened in time, and the operation safety of the hydro-cylinder is improved.

DETAILED DESCRIPTION OF THE EMBODIMENTS

The present disclosure is further described in conjunction with the attached drawings and embodiments.

In this disclosure, except as otherwise specified and limited, the terms such as "install", "link" and "connect" and "fix" should be generally understood, for example, the components can be fixedly connected, and also can be detachably connected or integrally formed; the components can be directly connected, and also can be indirectly connected through an intermediate medium, and two components can be communicated internally or interact with each other. For those skilled in the art, the specific meanings of the terms in the present disclosure can be understood according to specific conditions.

In the description of the present disclosure, it needs to be appreciated that the indicative orientation or position relations of the terms such as "center", "length", "upper", "lower", "front", "rear", "left", "right", "vertical", "horizontal", "top", "bottom", "inside" and "outside" are orientation or position relations illustrated based on the attached figures, just for facilitating the description of the present disclosure and simplifying the description, but not for indicating or hinting that the indicated device or element must be in a specific orientation and is constructed and operated in the specific orientation, the terms cannot be understood as the restriction of the present disclosure. In addition, the terms "first" and "second" are merely intended for a purpose of description, and shall not be understood as an indication or implication of relative importance or implicit indication of the number of indicated technical features. Therefore, a feature limited by "first" or "second" may include one or more features explicitly or implicitly. In the descriptions of the embodiments of the present invention, "plurality" means at least two, unless otherwise specified.

In the present disclosure, unless expressly specified and limited otherwise, a first feature being "above" or "below" a second feature may include that the first feature and the second feature are in direct contact or that the first feature and the second feature are not in direct contact but are in contact through another feature. Moreover, the first feature being "over", "above" and "on" the second feature can be the first feature being directly above and obliquely above the second feature, or simply mean that the first feature is at a higher level than the second feature. The first feature being "under", "below" and "underneath" the second feature can be the first feature being directly below and obliquely below the second feature, or simply mean that the first feature is at a lower level than the second feature.

Figure 1:
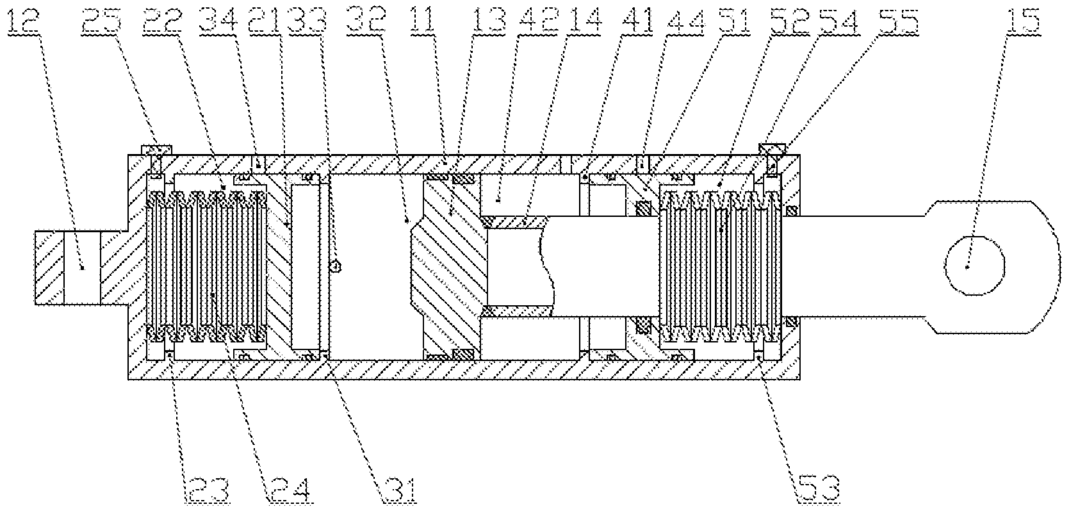
FIG. 1 is a front sectional view of the structure of the present disclosure.
Figure 2:
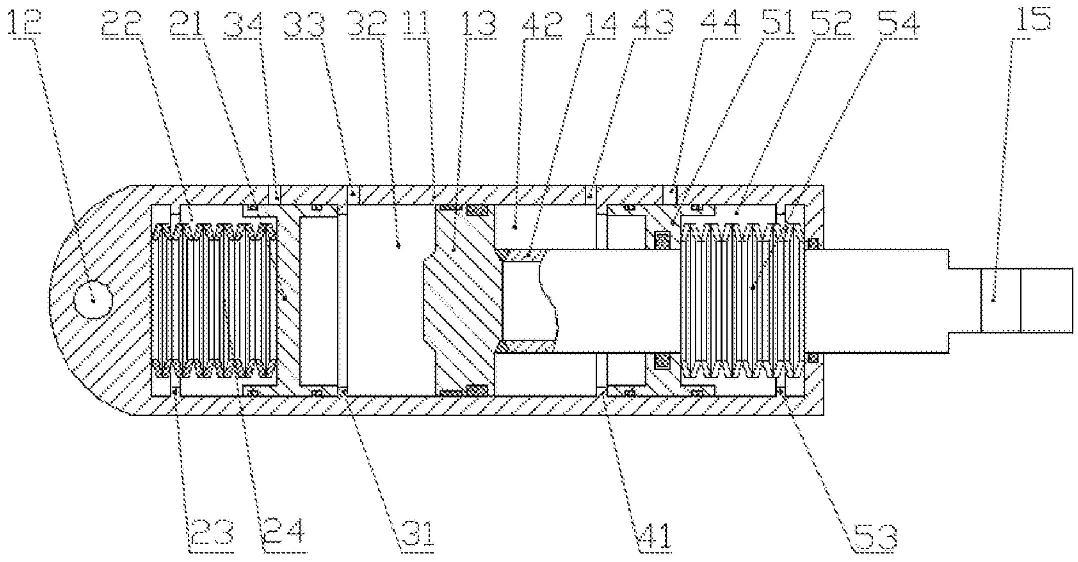
FIG. 2 is a top sectional view of the structure of the present disclosure.

As shown in FIG. 1 and FIG. 2, an impact-resistant balanced hydro-cylinder with pressure relief and buffering protection includes a cylinder body 11, a piston 13, a piston rod 14, and a first valve core 21 and a second valve core 51 slidable relative to the cylinder body 11. The piston 13 and the piston rod 14 are fixedly connected by welding etc. A closed first gas cavity 22 is formed between the first valve core 21 and an inter wall of an end of the cylinder body 11, and a closed second gas cavity 52 is formed between the second valve core 51 and an inner wall of an opposite end of the cylinder body 11. A one-way valve 25 for the first gas cavity and a one-way valve 55 for the second gas cavity are mounted on the cylinder body 11, and communicate with the first gas cavity 22 and the second gas cavity 52 respectively for inputting gas into the gas cavities so as to adjust the pressure in the gas cavities. A closed first oil cavity 32 is formed between the first valve core 21 and an end face of the piston 13, and a closed second oil cavity 42 is formed between the second valve core 51 and another end face of the piston 13. A through hole 33 for the first oil cavity is provided at a position on the cylinder body 11 corresponding to the first oil cavity, and a through hole 43 for the second oil cavity is provided at a position on the cylinder body 11 corresponding to the second oil cavity 42, to inputting or outputting the oil. By adjusting the density of hydraulic oil in the oil cavities and the density of gas in the gas cavities, the pressure in the gas cavities is larger than the pressure in the oil cavities, and it is ensured that the hydro-cylinder can push the piston rod to act normally under the pressure of a normal hydraulic system. When the pressure in the oil cavities is too large, the valve cores are pushed to move, so that the volumes of the oil cavities are increased, and the oil pressure in the oil cavities is reduced, and the buffering effect is achieved. In order to improve the effectiveness and the reliability of the buffering effect of the hydro-cylinder, the first gas cavity 22 and the second gas cavity 52 are internally provided with damping elements respectively, and the damping elements are arranged on the inner walls of the two ends of the cylinder body 11 respectively. The valve cores are blocked through both the gas pressure in the gas cavities and the damping elements. Considering that the internal pressure of the hydro-cylinder is large, the damping elements include a disc spring 24 for the first gas cavity disposed in the first gas cavity 22 and a disc spring 54 for the second gas cavity disposed in the second gas cavity 52. Due to the characteristics that the disc springs are large in load and small in required space, on one hand, the disc springs can act on the valve cores together with gas pressure in the gas cavities, and on the other hand, if high-pressure gas leaks due to sealing failure of the gas cavities, the valve cores can play a buffering role under the independent action of the disc springs. Therefore, graded buffering effect is achieved, the buffering force is improved, and the protection effect on the hydro-cylinder is enhanced. In order to improve the buffering effect of the disc springs, the two ends of the disc spring 24 for the first gas cavity abut against the inner wall of the cylinder body 11 and the first valve core 21 respectively, and the two ends of the disc spring 54 for the second gas cavity abut against the inner wall of the cylinder body 11 and the second valve core 51 respectively.

In order to limit the displacement ranges of the valve cores, a limiting boss 23 for the first gas cavity and a limiting boss 31 for the first oil cavity are arranged on the inner wall of the cylinder body 11 on two sides of the first valve core 21 respectively, and a limiting boss 53 for the second gas cavity and a limiting boss 41 for the second oil cavity are arranged on the inner wall of the cylinder body 11 on two sides of the second valve core 51 respectively. And the limiting boss 23 for the first gas cavity and the limiting boss 53 for the second gas cavity are arranged close to end faces of the cylinder body 11 and arranged on the sides of the one-way valves for the gas cavities away from the ends of the cylinder body 11, respectively, so that ventilation of the one-way valves is prevented from being obstructed when the valve cores are moving, and the moving range of the valve cores is rigidly positioned. The limiting boss 23 for the first gas cavity, the limiting boss 31 for the first oil cavity, the limiting boss 41 for the second oil cavity and the limiting boss 53 for the second gas cavity each are annular bosses, and are integrally formed with the cylinder body 11, so that the positioning effect of the bosses on the valve cores is improved. An oil drainage hole 34 for the first oil cavity is formed at a position on the cylinder body 11 corresponding to the first valve core 21, and an oil drainage hole 44 for the second oil cavity is formed at the position on the cylinder body 11 corresponding to the second valve core 51. When the first valve core 21 and the second valve core 51 abut against the limiting boss 23 for the first gas cavity and the limiting boss 52 for the second gas cavity respectively, the oil drainage hole 34 for the first oil cavity and the oil drainage hole 44 for the second oil cavity communicate with the first oil cavity 32 and the second oil cavity 42 respectively. When the pressure in the oil cavities is larger than the pressure of the gas cavities, the valve cores are pushed to move in the direction of the gas cavities until the oil drainage hole 34 for the first oil cavity and the oil drainage hole 44 for the second oil cavity are exposed, the oil in the oil cavities is discharged through the oil drainage holes, and therefore the pressure relief effect is achieved.

Valve core sealing rings are arranged at the position on the cylinder body 11 where the first valve core 21 and the second valve core 51 contact with the cylinder body 11, a piston sealing ring is arranged at the position on the piston 13 where the cylinder body 11 contacts with the piston 13, a guide ring and a piston rod sealing ring are arranged at the position on the piston rod 14 where the cylinder body 11 contacts with the piston rod 14, and a piston rod sealing ring is arranged at the position on the piston rod 14 where the piston rod 14 contacts with the second valve core 51, and the sealing rings are additionally arranged to reduce the contact between sliding surfaces, so that the sealing performance between the contact surfaces is enhanced while the friction is reduced. A connecting hole 12 for the cylinder body is formed in an end of the cylinder body 11 away from the piston rod 14, and a connecting hole 15 for the piston rod is formed in the tip of the free end of the piston rod 14, for connection in mounting.

Figure 3:
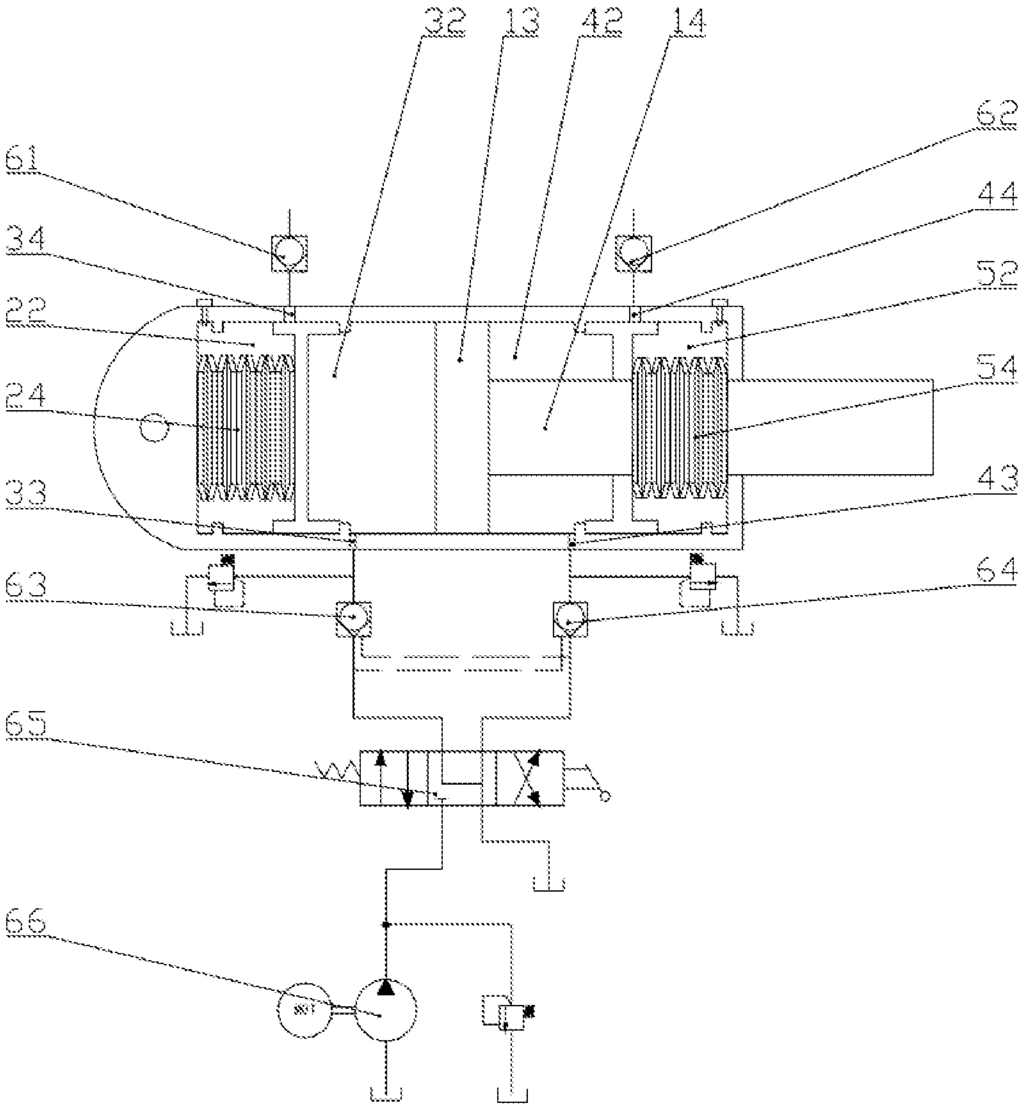
FIG. 3 is a view of the hydraulic system applied in the present disclosure.

When in use, the hydraulic system where the hydro-cylinder is located is shown in FIG. 3. The pressure of the gas cavities and the pressure of the oil cavities in the hydro-cylinder are determined by calculation according to actual working requirements, and gas with certain pressure is filled into the first gas cavity 22 and the second gas cavity 52 through the one-way valve 25 for the first gas cavity and the one-way valve 55 for the second gas cavity respectively. The first oil cavity 32 and the second oil cavity 42 communicate with a reversing valve 65 through a first hydraulic-control one-way valve 63 and a second hydraulic-control one-way valve 64 respectively, and the oil drainage hole 34 for the first oil cavity and the oil drainage hole 44 for the second oil cavity communicate with a first overflow one-way valve 61 and a second overflow one-way valve 62 respectively. Taking oil inputting of the first oil cavity 32 as an example. A hydraulic pump 66 pumps hydraulic oil into the first oil cavity 32, when a hydraulic support is impacted and a safety valve connected with the hydraulic-control one-way valve cannot be opened in time, the first valve core 21 moves in the direction of the first gas cavity 22 under the action of high-pressure oil in the first oil cavity 32, the first gas cavity 22 and the disc spring 24 for the first gas cavity are compressed, and the volume of the first oil cavity 32 is increased, so that the quick and stable buffering effect is achieved; and when the first valve core 21 moves to the a place that oil drainage hole 34 for the first oil cavity is opened, the hydraulic oil in the first oil cavity 32 overflows through the first overflow one-way valve 61, and therefore the pressure relief effect is achieved. Meanwhile, external gas and impurities can be prevented from entering the oil cavity in the overflow process through the action of the one-way valve. When oil pressure in the first oil cavity 32 is relieved to a certain pressure or oil drainage is completed due to opening of the safety valve, the first valve core 21 moves in the direction of the piston 13 under the action of high-pressure gas in the first gas cavity 22 and the disc spring 24 for the first gas cavity, so that the first valve core 21 completely blocks the oil drainage hole 34 for the first oil cavity, overflow is stopped, and the pressure of the oil cavity is kept. When oil is fed into the second oil cavity 42, the operation principle and process of the hydro-cylinder are similar to those described above and are not repeated here.

The above content is only used for explaining the technical idea of the present disclosure, the present disclosure is not limited to the specific embodiments, and any change or modification made on the basis of the technical scheme falls within the protection scope of the claims of the present disclosure.

What is claimed is:

1. An impact-resistant balanced hydro-cylinder with pressure relief and buffering protection, comprising a cylinder body (11), a piston (13), a piston rod (14), and a first valve core (21) and a second valve core (51) slidable relative to the cylinder body (11), wherein a closed first gas cavity (22) is formed between the first valve core (21) and an inner wall of an end of the cylinder body (11) and a closed second gas cavity (52) is formed between the second valve core (51) and an inner wall of an opposite end of the cylinder body (11), a closed first oil cavity (32) is formed between the first valve core (21) and an end face of the piston (13) and a closed second oil cavity (42) is formed between the second valve core (51) and another end face of the piston (13), and a through hole (33) for the first oil cavity is provided at a position on the cylinder body (11) corresponding to the first oil cavity (32) and a through hole (43) for the second oil cavity is provided at a position on the cylinder body (11) corresponding to the second oil cavity (42); and wherein a one-way valve (25) for the first gas cavity and a one-way valve (55) for the second gas cavity are mounted on the cylinder body (11) and communicate with the first gas cavity (22) and the second gas cavity (52) respectively.

2. The impact-resistant balanced hydro-cylinder with pressure relief and buffering protection according to claim 1, wherein a limiting boss (23) for the first gas cavity and a limiting boss (31) for the first oil cavity are arranged on the inner wall of the cylinder body (11) on two sides of the first valve core (21) respectively, a limiting boss (53) for the second gas cavity and a limiting boss (41) for the second oil cavity are arranged on the inner wall of the cylinder body (11) on two sides of the second valve core (51) respectively, and the limiting boss (23) for the first gas cavity and the limiting boss (53) for the second gas cavity are arranged close to end faces of the cylinder body (11) respectively.

3. The impact-resistant balanced hydro-cylinder with pressure relief and buffering protection according to claim 2, wherein the limiting boss (23) for the first gas cavity, the limiting boss (31) for the first oil cavity, the limiting boss (41) for the second oil cavity and the limiting boss (53) for the second gas cavity each are annular bosses, and are integrally formed with the cylinder body (11).

4. The impact-resistant balanced hydro-cylinder with pressure relief and buffering protection according to claim 2, wherein an oil drainage hole (34) for the first oil cavity is formed at a position on the cylinder body (11) corresponding to the first valve core (21) and an oil drainage hole (44) for the second valve core is formed at a position on the cylinder body (11) corresponding to the second valve core (51), and when the first valve core (21) and the second valve core (51) abut against the limiting boss (23) for the first gas cavity and the limiting boss (53) for the second gas cavity respectively, the oil drainage hole (34) for the first oil cavity and the oil drainage hole (44) for the second oil cavity communicate with the first oil cavity (32) and the second oil cavity (42) respectively.

5. The impact-resistant balanced hydro-cylinder with pressure relief and buffer protection according to claim 1, wherein the first gas cavity (22) and the second gas cavity (52) are internally provided with damping elements respectively, and the damping elements are arranged on inner walls of two ends of the cylinder body (11) respectively.

6. The impact-resistant balanced hydro-cylinder with pressure relief and buffering protection according to claim 5, wherein the damping elements comprise a disc spring (24) for the first gas cavity disposed in the first gas cavity (22) and a disc spring (54) for the second gas cavity disposed in the second gas cavity (52).

7. The impact-resistant balanced hydro-cylinder with pressure relief and buffering protection according to claim 6, wherein two ends of the disc spring (24) for the first gas cavity abut against the inner wall of the cylinder body (11) and the first valve core (21) respectively, and two ends of the disc spring (54) for the second gas cavity abut against the inner wall of the cylinder body (11) and the second valve core (51) respectively.

8. The impact-resistant balanced hydro-cylinder with pressure relief and buffering protection according to claim 1, wherein valve core sealing rings are arranged at positions on the cylinder body (11) where the first valve core (21) and the second valve core (51) contact with the cylinder body (11), a piston sealing ring is arranged at a position on the piston (13) where the cylinder body (11) contacts with the piston (13), and piston rod sealing rings are arranged at positions on the piston rod (14) where the second valve core (51) and the cylinder body (11) contact with the piston rod (14) respectively.

9. The impact-resistant balanced hydro-cylinder with pressure relief and buffering protection according to claim 1, wherein a connecting hole (12) for the cylinder body is formed in an end of the cylinder body (11) away from the piston rod (14), and a connecting hole (15) for the piston rod is formed in a tip of a free end of the piston rod (14).

* * * * *